United States Patent
Uceda-Sosa et al.

(10) Patent No.: US 6,721,742 B1
(45) Date of Patent: Apr. 13, 2004

(54) METHOD, SYSTEM AND PROGRAM PRODUCTS FOR MODIFYING GLOBALLY STORED TABLES OF A CLIENT-SERVER ENVIRONMENT

(75) Inventors: Rosario A. Uceda-Sosa, Hartsdale, NY (US); Steven R. Champagne, Poughkeepsie, NY (US); Gregory D. Laib, Kingston, NY (US); Kailash N. Marthi, Poughkeepsie, NY (US); Marcos N. Novaes, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 684 days.

(21) Appl. No.: 09/583,585

(22) Filed: May 31, 2000

(51) Int. Cl.[7] ............................................. G06F 17/30
(52) U.S. Cl. ..................... 707/10; 707/102; 707/104.1; 707/203; 709/203; 709/217
(58) Field of Search ............................ 707/8, 10, 104.1, 707/201–204, 1, 102; 709/203, 219, 217

(56) References Cited

U.S. PATENT DOCUMENTS

| | | | |
|---|---|---|---|
| 5,448,727 A | | 9/1995 | Annevelink .................... 707/1 |
| 5,684,990 A | * | 11/1997 | Boothby ..................... 707/203 |
| 5,781,908 A | * | 7/1998 | Williams et al. ............. 709/223 |
| 5,870,759 A | * | 2/1999 | Bauer et al. ................. 707/201 |
| 5,897,634 A | | 4/1999 | Attaluri et al. ................. 707/8 |
| 5,966,707 A | | 10/1999 | Van Huben et al. .......... 707/10 |
| 6,012,067 A | | 1/2000 | Sarkar ......................... 707/103 |
| 6,167,433 A | * | 12/2000 | Maples et al. .............. 709/204 |
| 6,226,650 B1 | * | 5/2001 | Mahajan et al. ............ 707/201 |
| 6,321,236 B1 | * | 11/2001 | Zollinger et al. ........... 707/203 |
| 6,405,220 B1 | * | 6/2002 | Brodersen et al. .......... 707/202 |
| 6,442,533 B1 | * | 8/2002 | Hinkle ......................... 705/35 |

OTHER PUBLICATIONS

"Automatic Cache Invalidation and Refresh in a Client Server Environment", IBM Technical Disclosure Bulletin, Vo. 36, No. 07, Jul. 1993, pp. 399–404.

* cited by examiner

*Primary Examiner*—Jean R. Homere
*Assistant Examiner*—Leslie Wong
(74) *Attorney, Agent, or Firm*—Lawrence D. Cutter, Esq.; Blanche E. Schiller, Esq.; Heslin Rothenberg Farley & Mesiti P.C.

(57) ABSTRACT

At least a portion of a table stored in a global data repository is selected to be accessed and modified. The selected portion is stored in a local table in local memory of a node of a client-server environment. The local table is modified, and then at least a portion of the modified local table is merged with the global table. The merger is performed without requiring any user locking of the global table.

52 Claims, 10 Drawing Sheets

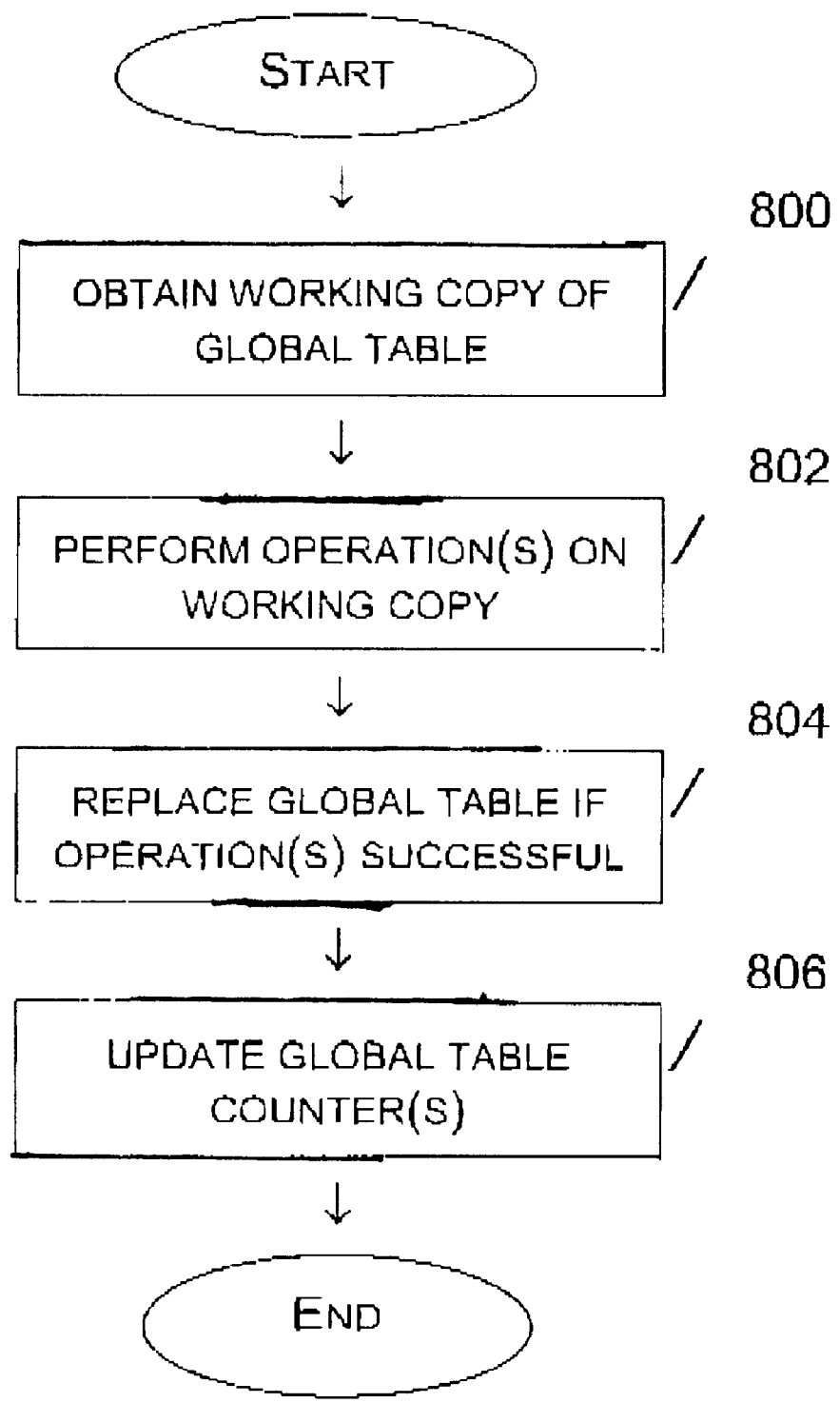
FIG. 8 (NEW)

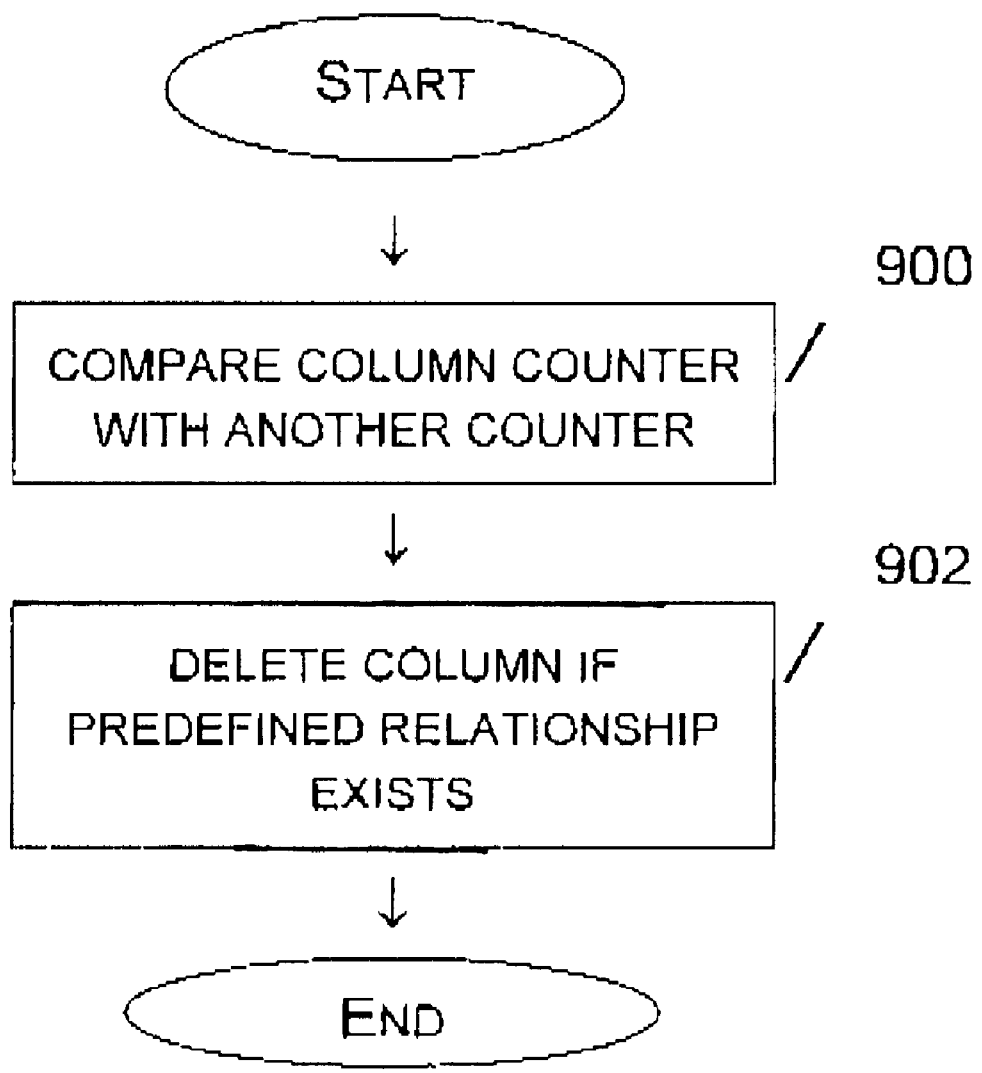
FIG. 9 (NEW)

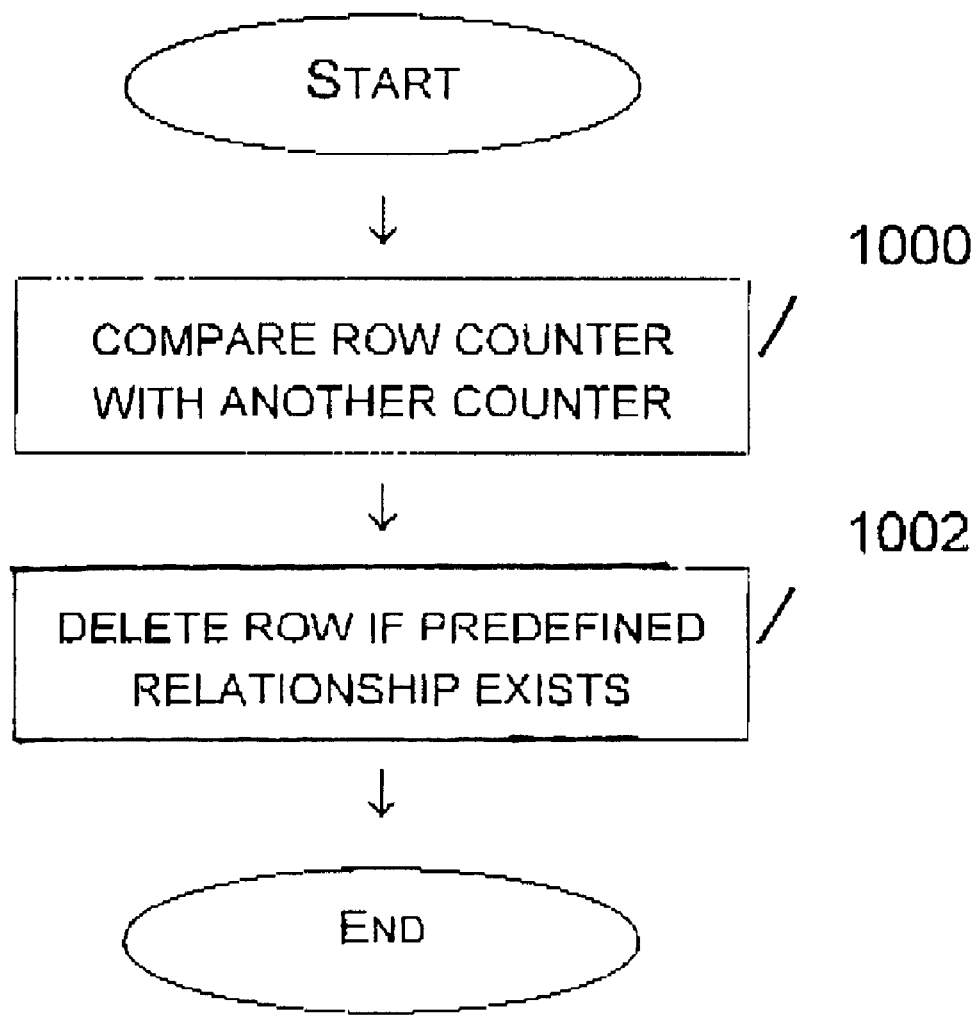
FIG. 10 (NEW)

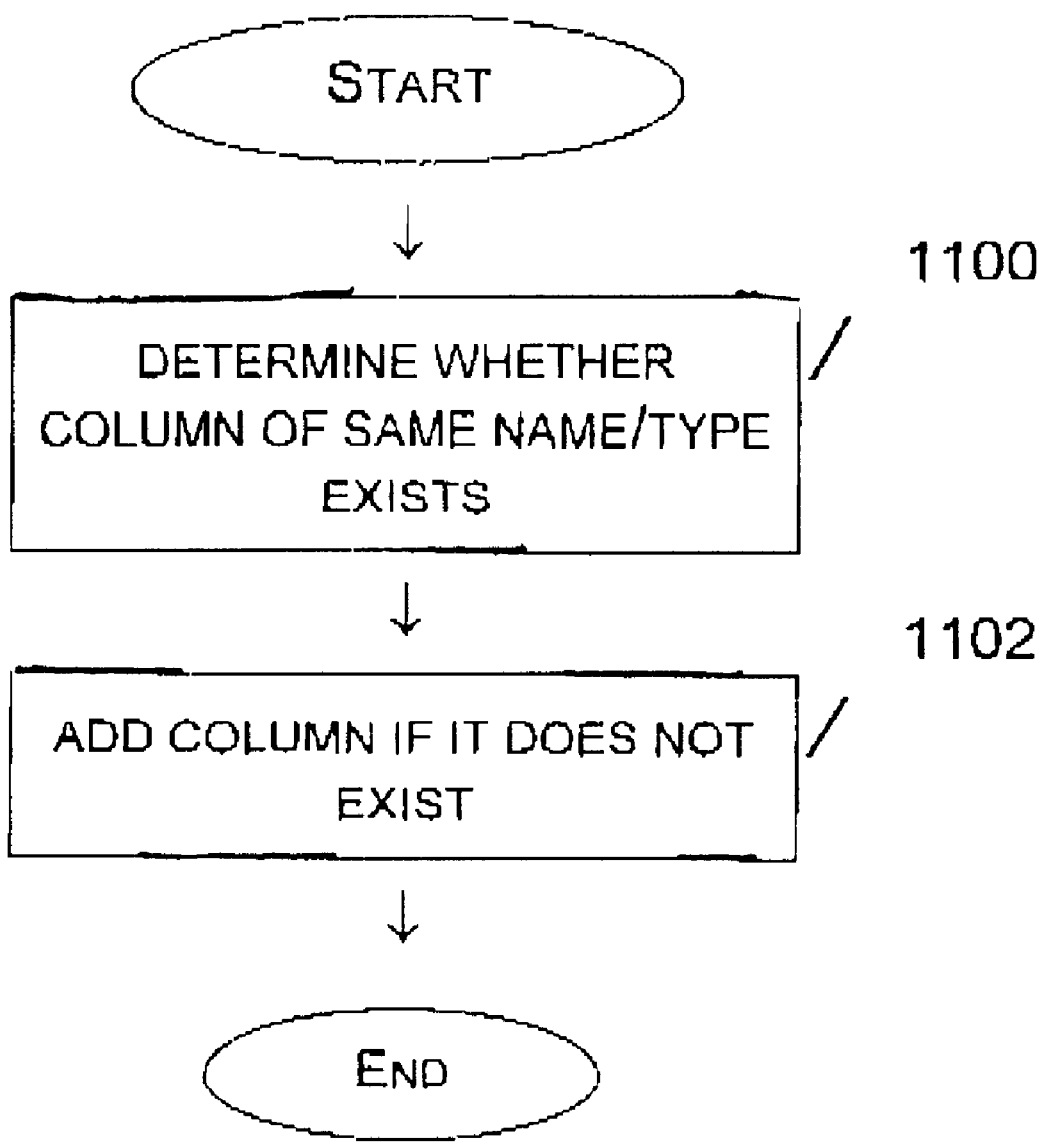
FIG. 11 (NEW)

METHOD, SYSTEM AND PROGRAM PRODUCTS FOR MODIFYING GLOBALLY STORED TABLES OF A CLIENT-SERVER ENVIRONMENT

Cross-Reference to Related Applications

This application contains subject matter which is related to the subject matter of the following applications, each of which is assigned to the same assignee as this application and filed on the same day as this application. Each of the below listed applications is hereby incorporated herein by reference in its entirety:

"Method, System And Program Products For Efficiently Locking Resources Of A Global Data Repository," Uceda-Sosa et al., Ser. No. 09/583,797, filed May 31, 2000;

"Method, System And Program Products For Concurrent Write Access To A Global Data Repository," Uceda-Sosa et al., Ser. No. 09/584,523, filed May 31, 2000; and "Method, System And Program Products For Concurrently Accessing A Global Data Repository By Multi-threaded Clients," Uceda-Sosa et al., Ser. No. 09/584,609, filed May 31, 2000.

TECHNICAL FIELD

This invention relates, in general, to a distributed computing environment, and in particular, to managing the accessing and modifying of data located in a global repository of the distributed computing environment.

BACKGROUND ART

Distributed systems are highly-available, scalable systems that are utilized in various situations, including those situations that require a high-throughput of work or continuous or nearly continuous availability of the system.

Typically, clients of a distributed system desire access to and modification of data residing in a global repository accessible by one or more servers of the system. In order to prevent corruption of the data, techniques are needed to manage the access and modification of the data.

One previous technique includes locally caching the data, so that clients have access to the data. This often results in complex and error prone data caching validation techniques, which can hinder performance of the repository, if the data access does not follow data locality patterns.

In a further example, the data is always accessed at the server and brought over the network. This allows the user to take advantage of the search engine of the server, but there is a high performance price to be paid.

Based on the foregoing, a need still exists for a capability that facilitates efficient access and modification of data stored in remote repositories.

SUMMARY OF THE INVENTION

The shortcomings of the prior art are overcome and additional advantages are provided through the provision of a method of modifying stored tables of a client-server environment. The method includes, for instance, providing, in local memory of a node of the client-server environment, a local table comprising at least a portion of a global table concurrently accessible by a plurality of users of the client-server environment, wherein the local table is manipulatable via database functions, as if it was a global table; modifying the local table; and atomically merging at least a portion of the modified local table with the global table, wherein the merging is performed without user locking of the global table.

System and computer program products corresponding to the above-summarized methods are also described and claimed herein.

Advantageously, data access and modification is facilitated by an efficient and highly functional capability of the present invention.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 8 depicts one embodiment of the logic used to merge a working copy of the target table with the target table.

FIG. 9 depicts one embodiment of the logic associated with deleting a column in the target table.

FIG. 10 depicts embodiment of the logic associated with deleting a row in the target table.

FIG. 11 depicts one embodiment of the logic associated with adding a new column to the target table.

BEST MODE FOR CARRYING OUT THE INVENTION

In accordance with one or more aspects of the present invention, a user application can explicitly and efficiently access and modify data stored in a global repository. Data extracted from the global repository is cached locally, and then manipulated using the repository search engine with full transaction capabilities. This provides a simple, efficient and highly functional facility for accessing and modifying data (e.g., remote data) of a distributed computing environment.

Figure 1:
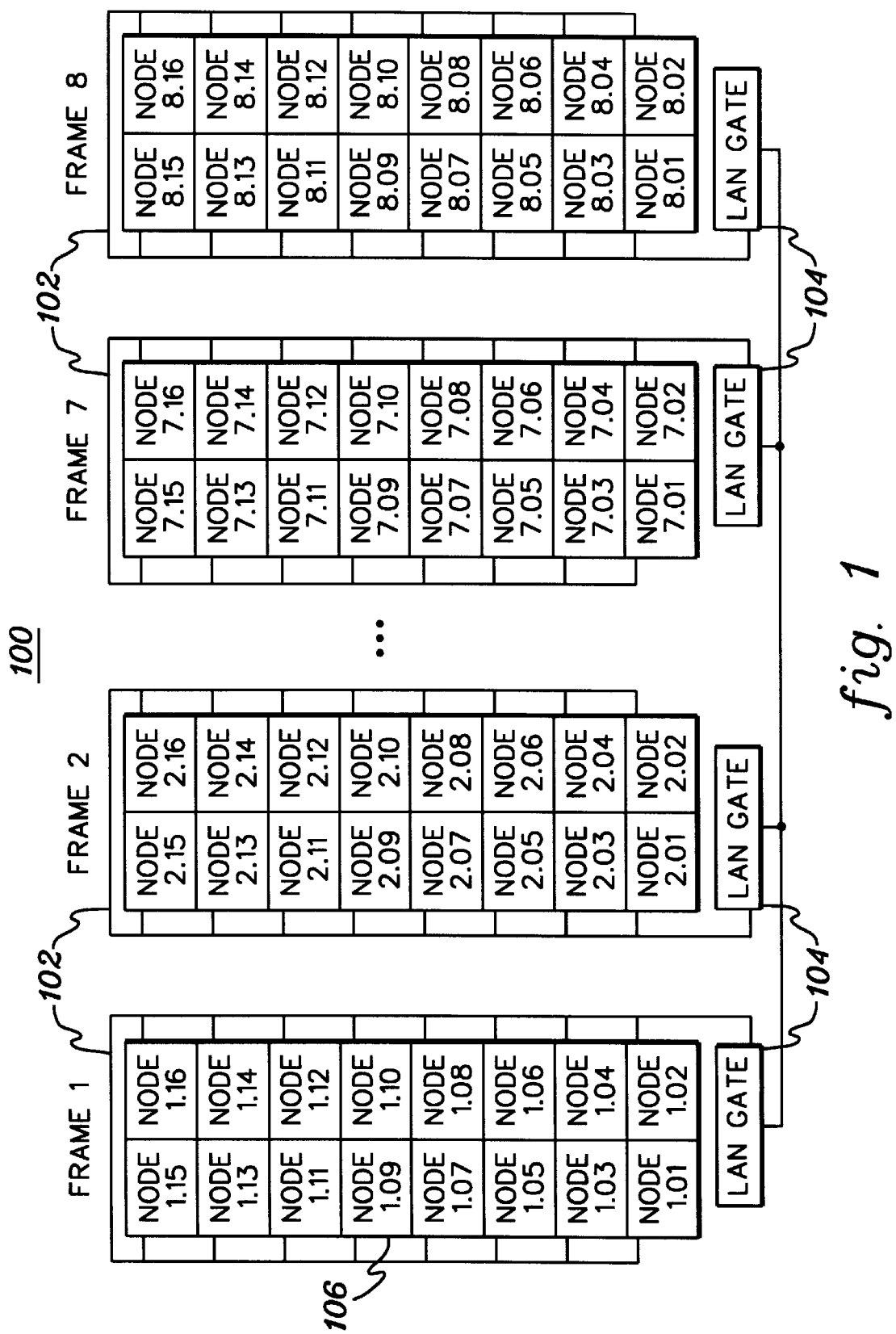
FIG. 1 depicts one example of a computing environment incorporating and using aspects of the present invention.

One example of a distributed computing environment incorporating and using aspects of the present invention is depicted in FIG. 1 and described herein. A distributed computing environment 100 includes, for instance, a plurality of frames 102, coupled to one another via a plurality of LAN gates 104. Frames 102 and LAN gates 104 are described in detail herein.

In one example, distributed computing environment 100 includes eight (8) frames, each of which includes a plurality of processing nodes 106. In one instance, each frame includes sixteen (16) processing nodes (each having one or more processors). Each processing node is, for instance, a RISC/6000 computer running AIX, a UNIX based operating system. Each processing node within a frame is coupled to the other processing nodes of the frame, via, for example, an internal LAN connection. Additionally each frame is coupled to the other frames via LAN gates 104.

As examples, each LAN gate 104 includes either a RISC/6000 computer, any computer network connection to the LAN, or a network router. However, these are only examples. It would be apparent to those skilled in the relevant art that there are other types of LAN gates, and that other mechanisms can also be used to couple the frames to one another.

The distributed computing environment of FIG. 1 is only one example. It is possible to have more or less than eight frames, or more or less than sixteen nodes per frame. Further, the processing nodes do not have to be RISC/6000 computers running AIX. Some or all of the processing nodes can include different types of computers and/or different operating systems. For example, this invention can be employed with LINUX and/or Windows operating systems. Further, a heterogeneous environment can include and utilize aspects of the invention in which one or more of the nodes and/or operating systems of the environment are distinct from other nodes or operating systems of the environment. The nodes of such a heterogeneous environment interoperate, in that they collaborate and share resources with each other. All of these variations are considered a part of the claimed invention.

Figure 2:
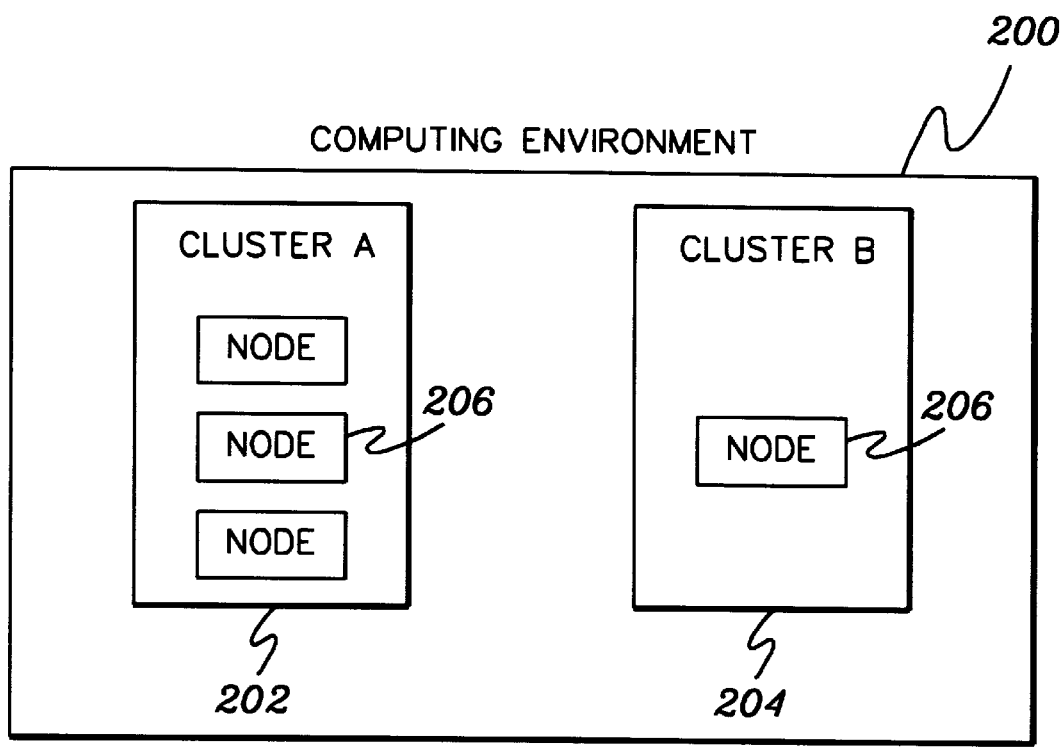
FIG. 2 depicts one embodiment of a computing environment having a plurality of clusters, used in accordance with an aspect of the present invention.

A distributed computing environment, which has the capability of sharing resources is termed a cluster. In particular, a computing environment can include one or more clusters. For example, as shown in FIG. 2, a computing environment 200 includes two clusters: Cluster A 202 and Cluster B 204. Each cluster includes one or more nodes 206, which share resources and collaborate with each other in performing system tasks. Each node includes an individual copy of the operating system.

Each cluster is managed by a cluster architecture, which includes a plurality of components (e.g., a management component, a registry component, a liveness component, a group services component and a resource management component. Each component executes one or more corresponding processes on one or more nodes of a cluster. If the component executes a plurality of processes on a plurality of nodes, then the architecture is distributed across those nodes. One example of a cluster architecture and the management of that architecture is described in detail in a U.S. patent application, entitled "Method, System And Program Products For Managing A Clustered Computing Environment," Novaes et al., Ser. No. 09/583,677, filed May 31, 2000, which is hereby incorporated herein by reference in its entirely.

Figure 3:
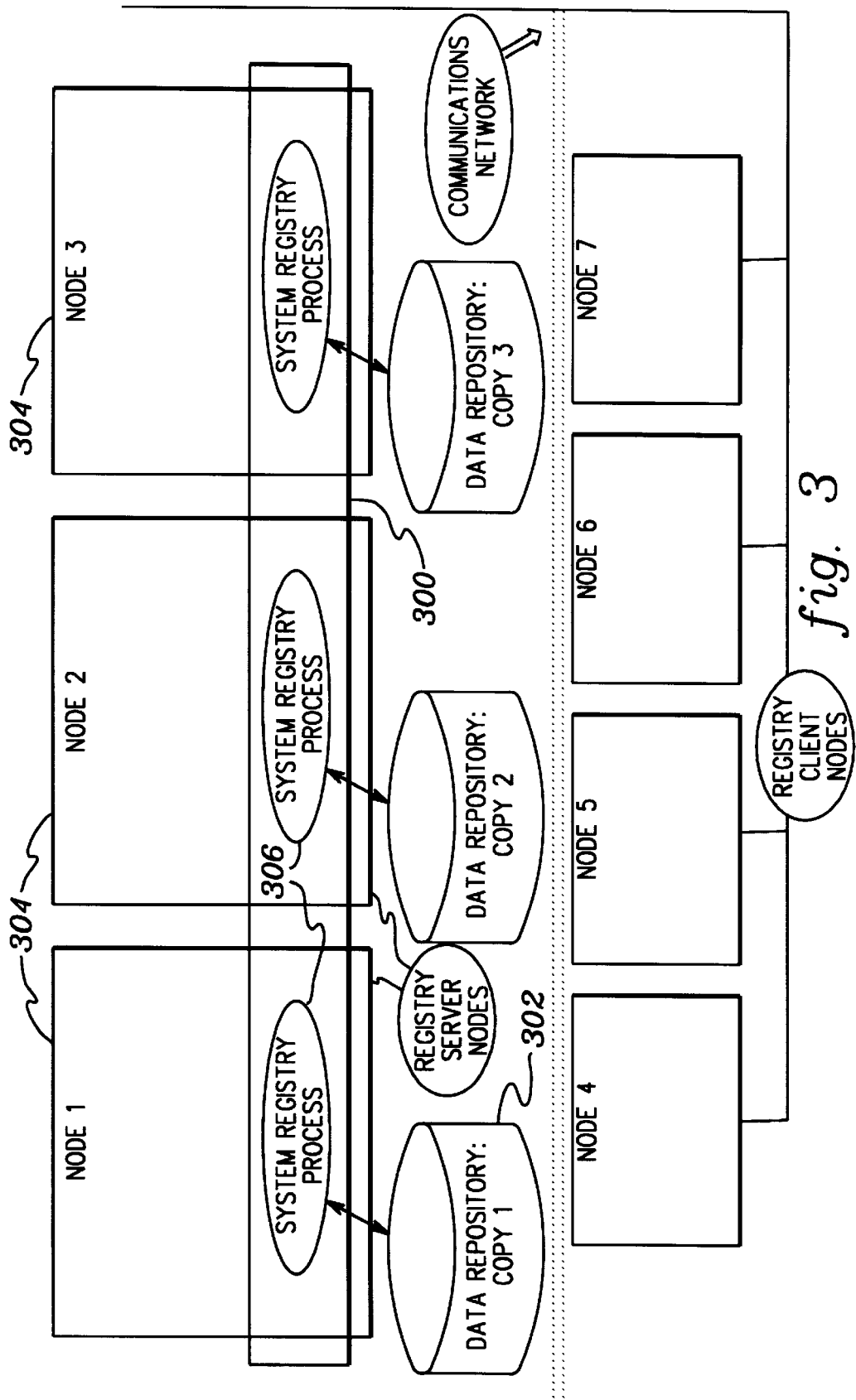
FIG. 3 depicts one embodiment of a computing environment in which a system registry component is located on only a portion of the nodes of the environment, in accordance with an aspect of the present invention.

The nodes of a cluster are capable of sharing resources and data with one another. In one embodiment, in order to facilitate the sharing of data, a system registry component 300 (FIG. 3) is used, which is highly available and provides access to one or more global data repositories 302. In one example, system registry 300 is replicated among a plurality of nodes 304, as system registry processes 306. In one embodiment, however, the system registry is replicated on fewer than all of the nodes of a cluster. As shown in FIG. 3, Nodes 1, 2 and 3 include a system registry process 306, while Nodes 4–7 do not. Nodes 4–7 are thus, considered registry client nodes of a client-server environment, while Nodes 1–3 are considered registry server nodes of the environment, since the registry function is executed on those nodes.

Figure 4A:
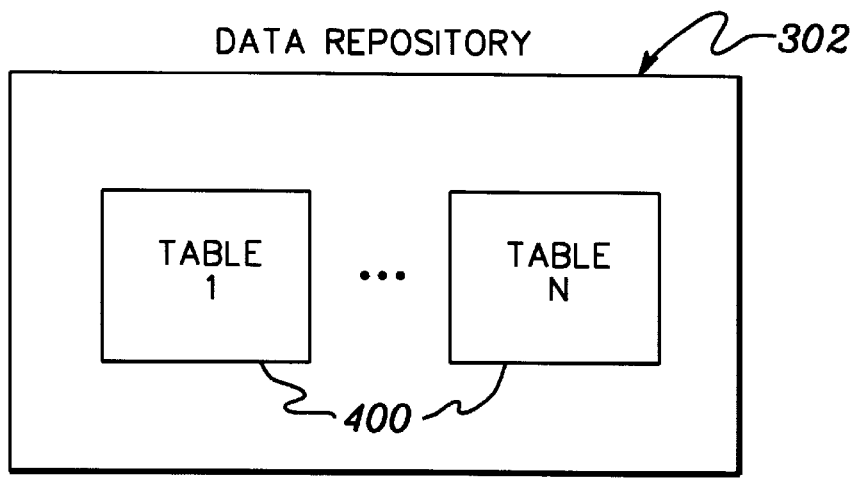
FIG. 4a depicts one embodiment of a data repository, in accordance with an aspect of the present invention.
Figure 4B:
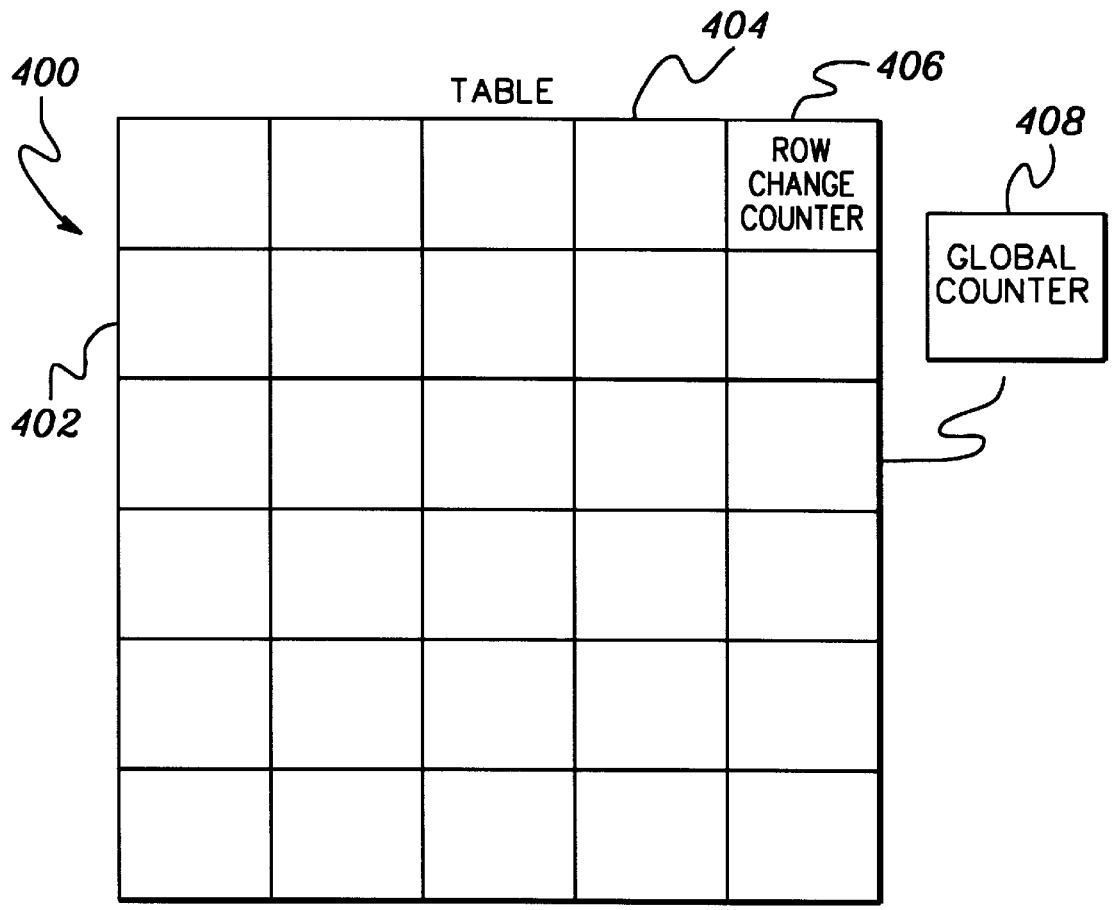
FIG. 4b depicts one embodiment of a table of the data repository of FIG. 4a, in accordance with an aspect of the present invention.

In one example, the data repository is a relational repository, in which the data is stored in one or more data structures (e.g., relational tables 400 (FIG. 4a)), that can be concurrently accessed in the client-server environment. Each table includes one or more rows 402 (FIG. 4b) and one or more columns 404. Typically, a column has a name and a fixed type, as well as a default value that is assigned to the column by the user when it is created. In one example, at least one of the columns is a distinguished column that acts as a primary key column. This column has no default value. Further, in accordance with an aspect of the present invention, each table has a reserved column 406, called a RowChangeCounter, that is updated at the time a row is modified. In one example, the RowChangeCounter is set equal to the value of a global counter 408, referred to as a TableChangeCounter, which is coupled to a given table and incremented each time a modification takes place in the table.

To facilitate access of the global data repository, in accordance with an aspect of the present invention, a user application executing on a client node of the client-server environment links to a Repository Client Library stored on or coupled to the client node. Further, both the clients and servers share a search and modification engine (an internal library stored on or coupled to the client and server nodes) that implements a complete set of data access services (e.g., retrieve, write, etc.). This allows a local table, including a local table that has been extracted from the server, to be manipulated via database functions, as if it was a global table.

Figure 5:
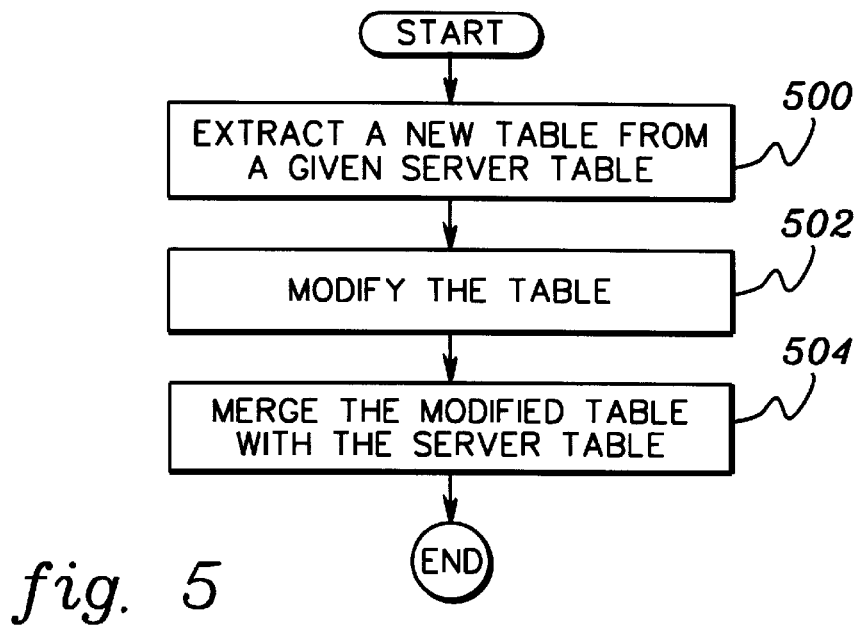
FIG. 5 depicts one embodiment of the logic used to select and modify a table, in accordance with an aspect of the present invention.

One embodiment of the logic used to access and modify a table of the global data repository is described with reference to FIG. 5. Initially, when a user application running on, for instance, a registry client node, wishes to make a modification to a table in the data repository, the user issues an application programming interface (API) function in order to extract a new table (referred to herein as a source table or ResultTable) from a given server table, STEP 500.

In one example, the API function is stored in the Client Repository Library, and is called using the following pseudocode:

ResultTablePTR extract (InputTableName, ProjectionCriteria, SelectionCriteria, SelectionParameters[ ]), in which the parameter, InputTableName identifies the server table from which data is to be extracted; and the ProjectionCriteria selects the columns to be part of the new result table. In one example, the RowChange-Counter column of the input server table and the TableChangeCounter column are also (at least implicitly) a part of the result table.

The SelectionCriteria is a string that allows the selection of any combination of rows of the input table; and the SelectionParameters is an array of variables utilized with the SectionCriteria, as described herein. In one example, the SelectionCriteria implements full boolean logic with regular expressions and parameter substitution. A scheme of the BNF (Backus-Naur Form) grammar used in one implementation of the SelectionCriteria is listed below:

<selectionCriteria>:=<andExp>|<andExp> OR
        <selectionCriteria>
    <andExp>:=<notExp>|<notExp> AND <andExp>
    <notExp>:=<parExp>|NOT <parExp>
    <parExp>:=<predicate>|(<predicate>)
    <predicate>:=<columnName>==<expression>
    <predicate>:=<columnName>!=<expression>
    <predicate>:=<columnName><<expression>
    <predicate>:=<columnName>><expression>
    <predicate>:=<columnName><=<expression>
    <predicate>:=<columnName>>=<expression>
    <predicate>:=<columnName>?=<regexExp>
    <expression>:=<constantLiteral>|% <paramVariable>

Where <constantLiteral> represents a string that can be converted to the type of the column, <regexExp> is a regular expression, and <paramVariable> is an uppercase letter that denotes the type of the column, and which works as a placeholder for the corresponding SeletionParameters array.

The extracted ResultTable is placed in the Repository Client Library, and it is unnamed. Further selects on this table can be performed from the client search engine in order to further refine the searches. The ResultTable can be manipulated and modified by adding/deleting rows and columns and/or by modifying existing rows and columns using the same primitives as the database, STEP 502.

Figure 6:
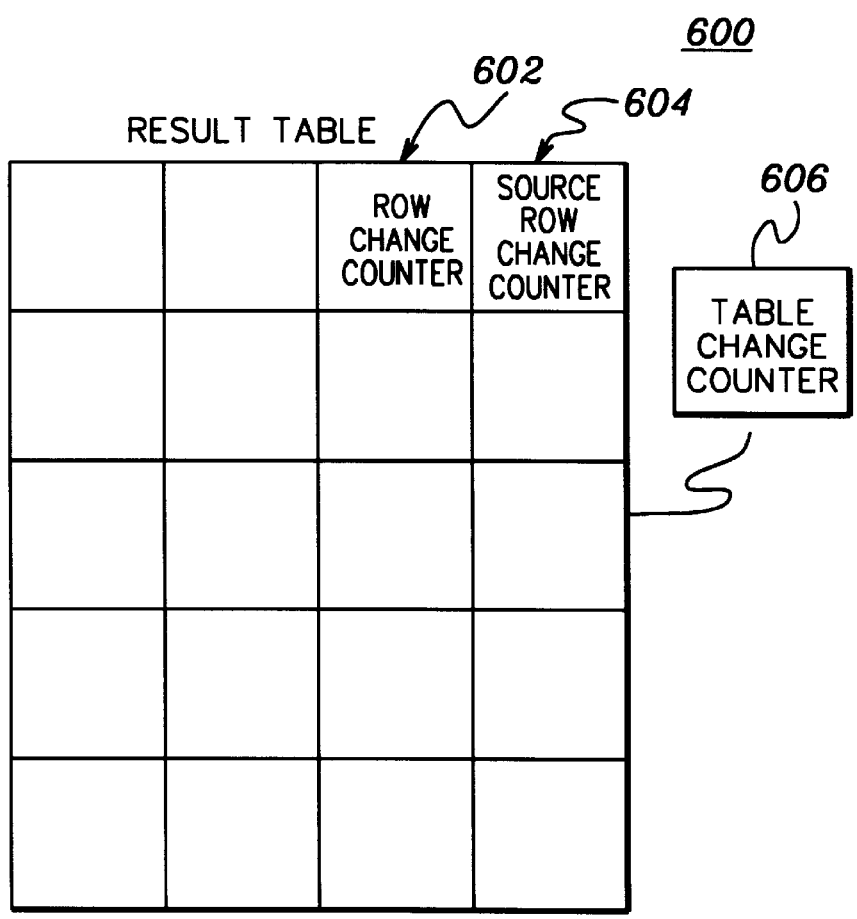
FIG. 6 depicts one example of a result table, in accordance with an aspect of the present invention.

One example of a ResultTable is described with reference to FIG. 6. In one example, a ResultTable 600 includes a plurality of columns and at least one row. For example, ResultTable 600 includes a RowChangeCounter column 602, and a second distinguished column, called the SourceRowChangeCounter 604. The SourceRowChangeCounter reflects the RowChangeCounter of the target table (i.e., the table from which data was extracted (e.g., the global table)). When the ResultTable is freshly extracted, the values of its RowChangeCounter and its SourceRowChangeCounter are the same. However, since the SourceRowChangeCounter column is read only, its values do not change. The ResultTable also has associated therewith a TableChangeCounter 606. Further, the RowChangeCounter of the ResultTable behaves, as described above.

Returning to FIG. 5, subsequent to modifying the extracted ResultTable, the user calls an API function (stored, for instance, in the Client Repository Library) to merge the modified table with the global table (a.k.a., the target table), STEP 504. As one example, the merge function has the following format:
ReturnCode Merge (localTableptr, TargetTableName, TableChangeCounter, RowChangeCounter),
in which the parameter, localTablePtr refers to the ResultTable to be merged; and TargetTableName indicates the table stored in the global storage, which is to be merged with the table identified by localTablePtr. The TableChangeCounter and RowChangeCounter parameters of this function call are optional. They indicate a desired version of a table that should be updated. For example, if the TableChangeCounter parameter is five, the target table is modified only if its TableChangeCounter is less than or equal to five. The same is true for the RowChangeCounter. Only rows with counters less than or equal to the RowChangeCounter parameter are modified. The SourceRowChangeCounter of the local table (i.e., the ResultTable) is passed to the server that is to perform the merge, but it is not merged with the target table.

The merge function allows any table (local or remote) to be merged with any other table. In one example, the merge operations are carried out in a working copy of the target table, while the target table is locked by the server (e.g., by mutexes or any other server synchronization mechanism). In accordance with the principles of the present invention, the merge function is performed without having the user perform any locking of the global table. That is, the locking is transparent to the user. If any of the operations fail, the working copy is discarded. If all the operations succeed, the working copy of the target table becomes the current version of the table. The TableChangeCounter of the target table is only updated once.

One embodiment of the logic used to merge the working copy of the target table (e.g., the global table) with the target table is described in detail with reference to FIG. 8. A working copy of the target table is obtained, STEP 800. One or more operation is then performed on the working copy to reflect one or more changes made to, in this example, a local table, STEP 802. If the one or more operations are performed successfully, the target table is replaced with the working copy, STEP 804. In response to replacing the target table, one or more counters associated there with is updated, STEP 806.

One embodiment of the logic used to merge the local table with the server table, such that the server table includes the user's modifications is described in detail with reference to FIG. 7. Although in this example, a local table (i.e., the source table) is being merged with a global table (i.e., the target table), this is only one example. Any table can be merged with any other table, local or remote. Further, the steps of this technique are performed in an order which provides consistent semantics and lightweight synchronization mechanisms for concurrent access. The first error encountered cancels the operation, as described below.

Figure 7:
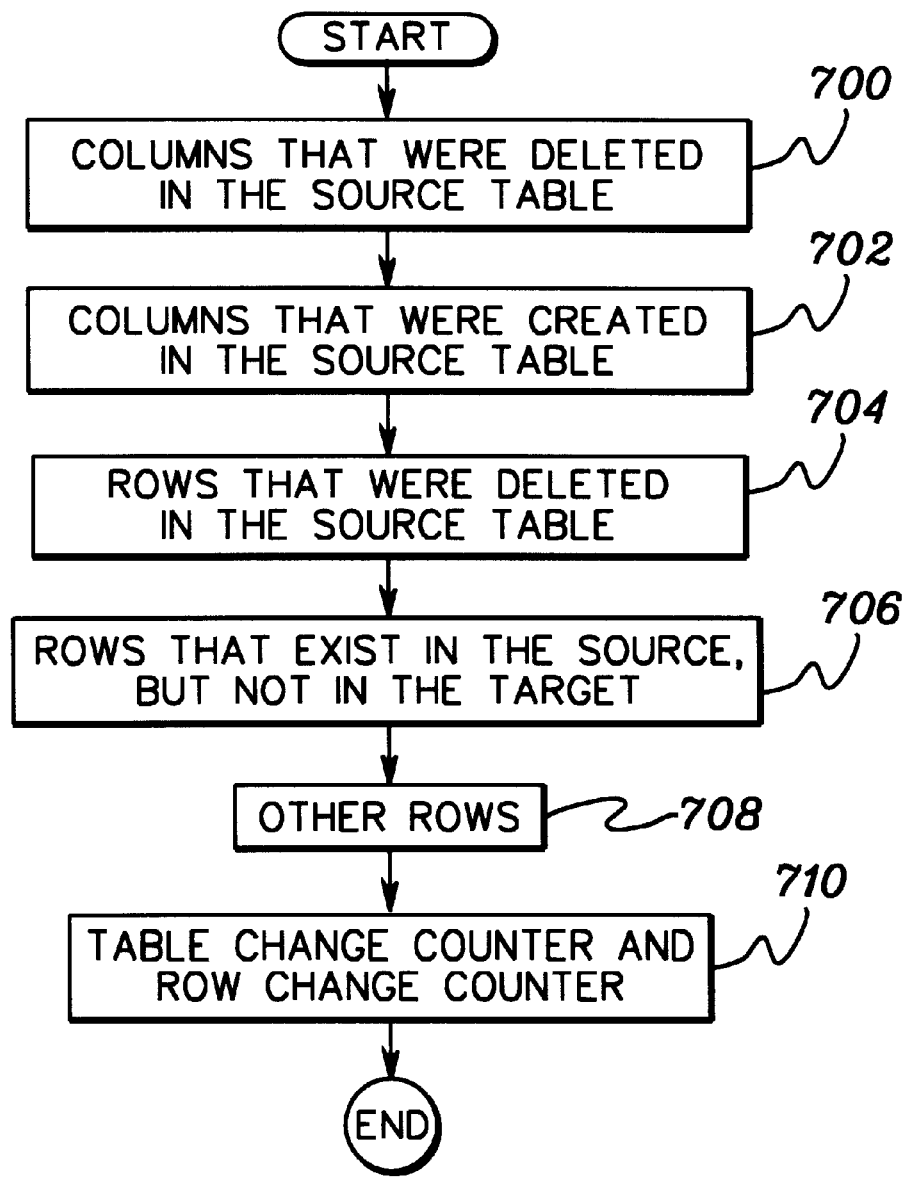
FIG. 7 depicts one embodiment of the logic used to merge one table with another table, in accordance with an aspect of the present invention.

Referring to FIG. 7, initially, the names and types of the columns that were deleted in the source table (which are kept track of by the Client Repository Library) are shipped back to the server as part of the metadata of the table, STEP 700.

One embodiment of the logic associated with deleting a column is described with respect to FIG. 9. A counter associated with the column in the source table is compared with anther counter, STEP 900. The column in the target table is deleted if a predefined relationship exists between the counter associated with the column in the source table and the other column, STEP 902.

For example, any target table column that has the same type and name is deleted, as long as the RowChangeCounter column of the target table has values no higher than those in the SourceRowChangeCounter column passed to the server. This is a synchronization check in case the table was altered by other users. Note that it is possible that a column is created and deleted and recreated again several times. In this case, only the last deletion is kept in the list.

Next, new columns that were created in the source table are handled, STEP 702. The new columns are added to the target table. While checking for existing columns with the same name, (since not all the columns may have been extracted or another user may have added other columns to the global table in the meantime).

One embodiment of the logic for adding the new columns is shown in FIG. 11. First it is determined whether a column of the same name and type exists as that in the source table exists in the target table, STEP 1100. If the column dose not already exist in the target table, it is added, STEP 1102. If a column with the same name, but different type exists in the target table, an error is returned and the merge operation ends.

One embodiment of the logie associated with deleting a row is described with respect to FIG. 10. A counter associated with the row in the source table is compared with another counter, STEP 1000. The row in the target table is deleted if a predefined relationship exists between the counter associated with the row in the source table and the other row, STEP 1002.

Each row that exists in the source table, but not in the target table, is added to the target table, STEP 706. Default values are used for the fields of columns that exist in the target table, but not in the source table.

The remaining rows in the source table are scanned, comparing each field with the corresponding ones in the target table, STEP 708. When a difference is encountered, the value of the field in the source table replaces the value in the target table.

The values of the TableChangeCounter and RowChangeCounter in the source table are ignored, STEP 710. In the target table, the TableChangeCounter is incremented by 1, if there are any changes to be reflected. The RowChangeCounter field for any rows added or modified is set equal to the TableChangeCounter of the target table.

Described in detail above is a technique that allows a user application to explicitly and efficiently cache data locally and to make use of the repository search engine with full transactional capabilities. Further, parameters are provided with the merge function such that concurrent modifications to the target (e.g., global) table are allowed. Thus, a maximum level of concurrency is achieved, without employing typical database semantics.

While a clustered environment is provided as one example, the invention is not limited to such an environment. Further, one or more aspects of the present invention are applicable to homogeneous systems, as well as heterogeneous systems. As one example, capabilities are provided to facilitate the interoperability of the systems of a heterogeneous environment.

Aspects of the invention are applicable to client-client environments, as well as client-server environments. For example, local tables can be merged with other local tables. Likewise, global tables can be merged with other global tables.

Further, while in the examples described herein each data repository is remote from the nodes, this is only one example. In other examples, one or more of the repositories can be local to one or more nodes. Further, each repository can be remote or local to users of the repositories.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of modifying stored tables of client-server environment, said method comprising:

providing, in local memory of a node of said client-server environment, a local table comprising at least a portion of a global table concurrently accessible by a plurality of users of said cliem-server environment, wherein said local table is manipulatable via database functions, as if it was a global table;

modifying said local table; and atomically merging at least a portion of the modified local table with said global table, wherein said merging is performed without user locking of said global table wherein said atomically merging comprises using at least one counter to determine how to modify said global table to reflect one or more changes of said modified local table, wherein said at least one counter comprises a table change counter, and wherein said global table is modified after a predefined relationship between said table change counter and a table parameter value is satisfied.

2. The method of claim 1, wherein said at least one counter comprises a row change counter, and wherein a row of said global table is modified after a predefined relationship between said row change counter of said row and a row parameter value is satisfied.

3. The method of claim 1, wherein said atomically merging comprises:

obtaining a working copy of said global table;

performing one or more operations on said working copy to reflect one or more changes of said modified local table; and replacing said global table with said working copy, if said one or more operations are performed successfully.

4. The method of claim 3, further comprising updating one or more counters associated with said global table, in response to said replacing.

5. The method of claim 3, wherein said performing one or more operations comprises at least one of the following:

(a) deleting from said working copy one or more columns deleted from said local table;

(b) adding to said working copy one or more columns added to said local table;

(c) deleting from said working copy one or more rows deleted from said local table;

(d) adding to said working copy one or more rows added to said local table; and (e) updating one or more fields of one or more rows of said working copy to reflect a new value in one or more corresponding fields of said local table.

6. The method of claim 5, wherein when one of the operations (a)–(c) is performed, the operation is performed as ordered in (a)–(c).

7. The method of claim 5, wherein the deleting of one or more columns comprises associated for at least one column of said one or more columns:

comparing a counter associated with said at least one column with another counter; and deleting said at least one column, should said counter have a predefined relationship with said another counter.

8. The method of claim 5, wherein the deleting of one or more rows comprises for at least one row of said one or more rows:

comparing a counter associated with said at least one row with another counter; and deleting said at least one row, should said counter have a predefined relationship with said another counter.

9. The method of claim 5, wherein the adding of one or more columns comprises for at least one column of said one or more columns:

determining whether a column having a same name and type as said at least one column already exists in said working copy; and adding said at least one column, if said at least one column does not already exist.

10. A system of modifying stored tables of a client-server environment, said system comprising:

means for providing, in local memory of a node of said client-server environment, a local table comprising at least a portion of a global table concurrently accessible by a plurality of users of said client-server environment, wherein said local table is manipulatable via database functions, as if it was a global table;

means for modifying said local table; and means for atomically merging at least a portion of the modified local table with said global table, wherein said merging is performed without user locking of said global table wherein said means for atomically merging comprises means for using at least one counter to determine how to modify said global table to reflect one or more changes of said modified local table, wherein said at least one counter comprises a table change counter, and wherein said global table is modified after a predefined relationship between said table change counter and a table parameter value is satisfied.

11. Program storage device readable by a machine, tangibly embodying at least one program of instructions executable by the machine to perform a method of modifying stored tables of a client-server environment, said method comprising:

providing, in local memory of a node of said client-server environment, a local table comprising at least a portion of a global table concurrently accessible by a plurality of users of said client-server environment, wherein said local table is manipulatable via database functions, as if it was a global table;

modifying said local table; and atomically merging at least a portion of the modified local table with said global table wherein said atomically merging comprises using at least one counter to determine how to modify said global table to reflect one or more changes of said modified local table, wherein said at least one counter comprises a table change counter, and wherein said global table is modified after a predefined relationship between said table change counter and a table parameter value is satisfied wherein said merging is performed without user locking of said global table.

12. The method of claim 5, wherein the adding of one or more rows comprises for at least one row of said one or more rows:

determining whether a row having a same name and type as said at least one row already exists in said working copy; and adding said at least one row, if said at least one row does not already exist.

13. The method of claim 5, wherein the updating of one or more fields comprises for at least one of said one or more fields:

comparing said at least one of said one or more fields in said working copy with at least one corresponding field in said local table; and replacing a value in said at least one of said one or more fields with a value in said at least corresponding field based on said comparing.

14. The method of claim 5, wherein the deleting of one or more columns comprises for at least one column of said one or more columns deleting when said at least one column has a same type and name as one or more corresponding columns in said local table.

15. The method of claim 7, wherein said another counter is associated with at least one corresponding column of said local table.

16. The method of claim 7, wherein said predefined relationship comprises said counter having a value no higher than that of said another counter.

17. The method of claim 8, wherein said another counter is associated with at least one corresponding row of said local table.

18. The method of claim 8, wherein said predefined relationship between said counter and said another counter comprises said counter having a value equal to that of said another counter.

19. The method of claim 8, further comprising:

searching in said working copy for a key for each row deleted from said local table; and deleting said at least one row only if said key is present in said working copy and said predefined relationship between said counter and said another counter is present.

20. The method of claim 9, further comprising returning an error if column in said working copy has a same name and different type as said at least one column.

21. The system of claim 12, wherein said table change counter comprises a row change counter wherein said table parameter value comprises a row parameter value and wherein a row of said global table is modified after a predefined relationship between said row change counter of said row and said row parameter value is satisfied.

22. The system of claim 10, wherein said means for atomically merging comprises:

means for obtaining a working copy of said global table;

means for performing one or more operations on said working copy to reflect one or more changes of said modified local table; and means for replacing said global table with said working copy, if said one or more operations are performed successfully.

23. The system of claim 22, further comprising means for updating one or more counters associated with said global table, in response to said replacing.

24. The system of claim 22, wherein said means for performing one or more operations comprises at least one of the following:

(a) means for deleting from said working copy one or more columns deleted from said local table;

(b) means for adding to said working copy one or more columns added to said local table;

(c) means for deleting from said working copy one or more rows deleted from said local table;

(d) means for adding to said working copy one or more rows added to said local table; and (e) means for updating one or more fields of one or more rows of said working copy to reflect a new value in one or more corresponding fields of said local table.

25. The system of claim 24, wherein the means for deleting of one or more columns comprises for at least one column of said one or more columns:

means for comparing a counter associated with said at least one column with another counter; and means for deleting said at least one column, should said counter have a predefined relationship with said another counter.

26. The system of claim 24, wherein the means for deleting of one or more rows comprises for at least one row of said one or more rows:

means for comparing a counter associated with said at least one row with another counter; and means for deleting said at least one row, should said counter have a predefined relationship with said another counter.

27. The system of claim 24, wherein the means for adding of one or more columns comprises for at least one column of said one or more columns:

means for determining whether a column having a same name and type as said at least one column already exists in said working copy; and means for adding said at least one column, if said at least one column does not already exist.

28. The system of claim 24, wherein the means for adding of one or more rows comprises for at least one row of said one or more rows:

means for determining whether a row having a same name and type as said at least one row already exists in said working copy; and means for adding said at least one row, if said at least one row does not already exist.

29. The system of claim 24, wherein the means for updating of one or more fields comprises for at least one of said one or more fields:

means for comparing said at least one of said one or more fields in said working copy with at least one corresponding field in said local table; and means for replacing a value in said at least one of said one or more fields with a value in said at least one corresponding field based on said comparing.

30. The system of claim 24, wherein the means for deleting of one or more columns comprises for at least one column of said one or more columns means for deleting when said at least one column has a same type and name as one or more corresponding columns in said local table.

31. The system of claim 25, wherein said another counter is associated with at least one corresponding column of said local table.

32. The system of claim 25, wherein said predefined relationship comprises said counter having a value no higher than that of said another counter.

33. The system of claim 26, wherein said another counter is associated with at least one corresponding row of said local table.

34. The system of claim 26, wherein said predefined relationship comprises said counter having a value equal to that of said another counter.

35. The system of claim 26, further comprising:

means for searching in said working copy for a key for each row deleted from said local table; and means for deleting said at least one row only if said key is present in said working copy and said predefined relationship is present.

36. The system of claim 27, further comprising means for returning an error if a column in said working copy has a same name and different type as said at least one column.

37. The at least one program storage device of claim 13, wherein said table change counter comprises a row change counter wherein said table parameter value comprises a row parameter value and wherein a row of said global table is modified after a predefined relationship between said row change counter of said row and said row parameter value is satisfied.

38. The at least one program storage device of claim 11, wherein said atomically merging comprises:

obtaining a working copy of said global table;

performing one or more operations on said working copy to reflect one or more changes of said modified local table; and replacing said global table with said working copy, if said one or more operations are performed successfully.

39. The at least one program storage device of claim 38, further comprising updating one or more counters associated with said global table, in response to said replacing.

40. The at least one program storage device of claim 38, wherein said performing one or more operations comprises at least one of the following:

(a) deleting from said working copy one or more columns deleted from said local table;

(b) adding to said working copy one or more columns added to said local table;

(c) deleting from said working copy one or more rows deleted from said local table;

(d) adding to said working copy one or more rows added to said local table; and (e) updating one or more fields of one or more rows of said working copy to reflect a new value in one or more corresponding fields of said local table.

41. The at least one program storage device of claim 40, wherein the deleting of one or more columns comprises for at least one column of said one or more columns:

comparing a counter associated with said at least one column with another counter; and deleting said at least one column, should said counter have a predefined relationship with said another counter.

42. The at least one program storage device of claim 40, wherein the deleting of one or more rows comprises for at least one row of said one or more rows:

comparing a counter associated with said at least one row with another counter; and deleting said at least one row, should said counter have a predefined relationship with said another counter.

43. The at least one program storage device of claim 40, wherein the adding of one or more columns comprises for at least one column of said one or more columns:

determining whether a column having a same name and type as said at least one column already exists in said working copy; and adding said at least one column, if said at least one column does not already exist.

44. The at least one program storage device of claim 40, wherein the adding of one or more row comprises for at least one row of said one or more rows:
- determining whether a row having a same name and type as said at least one row already exists in said working copy; and
- adding said at least one row, if said at least one row does not already exist.

45. The at least one program storage device of claim 40, wherein the updating of one or more fields comprises for at least one of said one or more fields:
- comparing said at least one of said one or more fields in said working copy with at least one corresponding field in said local table; and
- replacing a value in said at least one of said one or more fields with a value in said at least one corresponding field based on said comparing.

46. The at least one program storage device of claim 40, wherein the deleting of one or more columns comprises for at least one column of said one or more columns deleting when said at least one column has a same type and name as one or more corresponding columns in said local table.

47. The at least one program storage device of claim 41, wherein said another counter is associated with at least one corresponding column of said local table.

48. The at least one program storage device of claim 41, wherein said predefined relationship between said counter and said another counter comprises said counter having a value no higher than that of said another counter.

49. The at least one program storage device of claim 42, wherein said another counter is associated with at least one corresponding row of said local table.

50. The at least one program storage device of claim 42, wherein said predefined relationship between said counter and said another counter comprises said counter having a value equal to that of said another counter.

51. The at least one program storage device of claim 42, further comprising:
- searching in said working copy for a key for each row deleted from said local table; and
- deleting said at least one row only if said key is present in said working copy and said predefined relationship between said counter and said another counter is present.

52. The at least one program storage device of claim 43, further comprising returning an error if a column in said working copy has a same name and different type as said at least one column.

* * * * *

UNITED STATES PATENT AND TRADEMARK OFFICE
CERTIFICATE OF CORRECTION

PATENT NO.    : 6,721,742 B1
DATED         : April 13, 2004
INVENTOR(S)   : Uceda-Sosa et al.

It is certified that error appears in the above-identified patent and that said Letters Patent is hereby corrected as shown below:

Column 2,
Line 52, after "FIG. 10 depict" insert the word -- one --

Column 6,
Line 28, delete the words "there with" and insert the word -- therewith --
Line 62, delete the word "larget" and insert the word -- target --
Line 62, delete the words "table. While" an insert the words -- table, while --

Column 7,
Line 14, insert the following paragraph:
     -- Thereafter, for rows that were deleted in the source table, their keys are kept in a list associated with the source table together with their SourceRowChangeCounter value, STEP 704. The target table is scanned for these keys. If the keys are found and their RowChangeCounter values are the same as those recorded in the list, the rows are deleted. Otherwise, the rows are kept. This is a synchronization check in case the table was altered by other users. Note that it is possible that a row is created and deleted and recreated again several times. In this case, only the last deletion is kept in the list. --

Column 8,
Line 13, after "tables of" insert the word -- a --
Line 18, delete the word "cliem-server" and insert the word -- client-server --
Lines 63 and 64, delete "(a)-(c)" and insert -- (a)-(e) --
Line 66, after the word "comprises" delete the word "associated"

Column 9,
Line 55, after the words "with said global table" insert the words -- , wherein said merging is performed without user locking of said global table, --
Lines 62-64, after the word satisfied, delete words -- wherein said merging is performed without user locking of said global table --

UNITED STATES PATENT AND TRADEMARK OFFICE
CERTIFICATE OF CORRECTION

PATENT NO. : 6,721,742 B1
DATED : April 13, 2004
INVENTOR(S) : Uceda-Sosa et al.

It is certified that error appears in the above-identified patent and that said Letters Patent is hereby corrected as shown below:

Column 10,
Line 41, after the words "an error if" insert the word -- a --
Line 45, delete the words "value and" and insert the words -- value, and --

Column 12,
Line 13, delete the words "value and" and insert the words -- value, and --

Signed and Sealed this

Thirteenth Day of July, 2004

JON W. DUDAS
*Acting Director of the United States Patent and Trademark Office*